June 4, 1957 L. Z. HALL 2,794,575
APPARATUS FOR EMPTYING MATERIALS HANDLING CONTAINERS
Filed Nov. 4, 1955 2 Sheets-Sheet 1
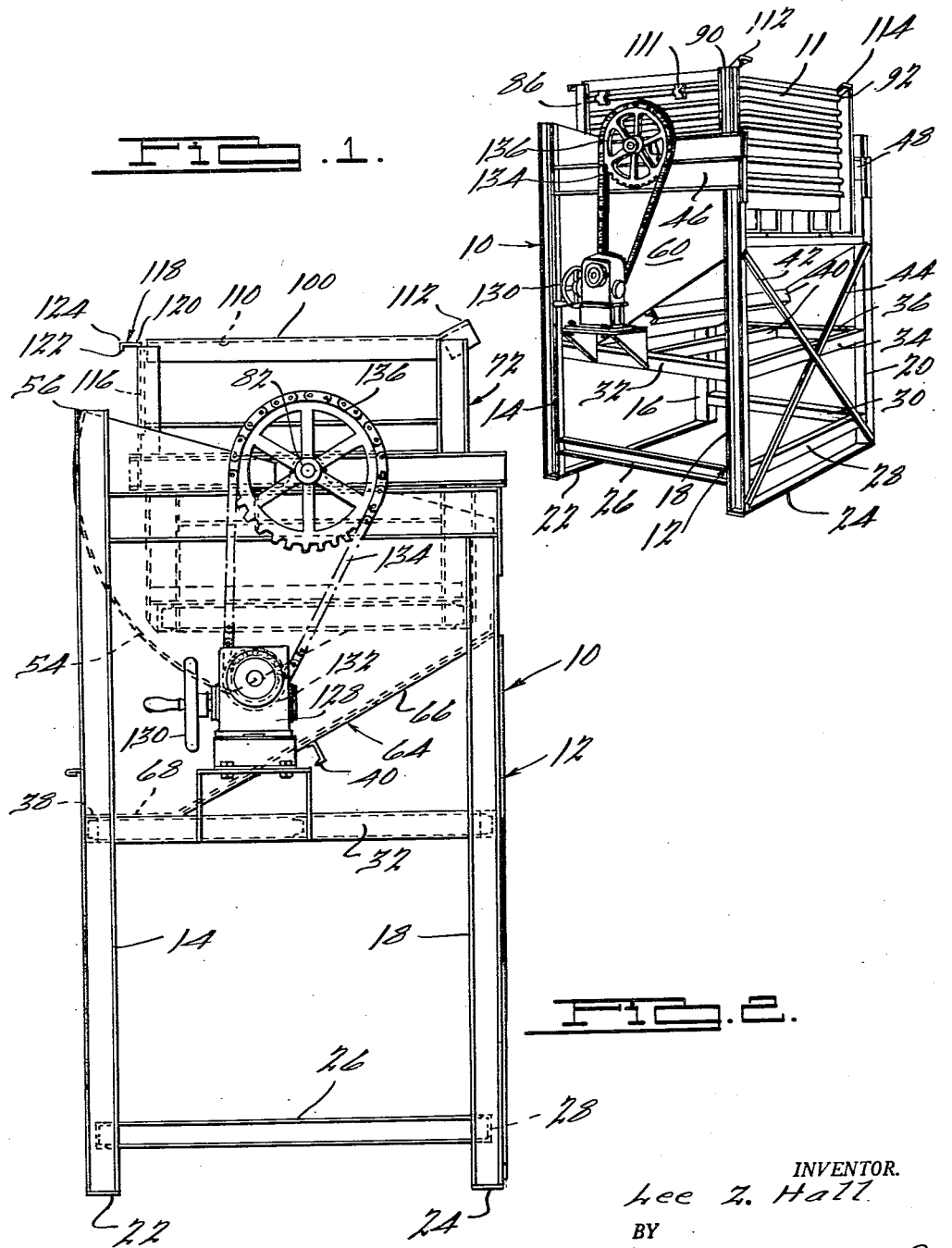
INVENTOR.
Lee Z. Hall
BY
Harness, Dickey & Pierce
ATTORNEYS June 4, 1957 L. Z. HALL 2,794,575
APPARATUS FOR EMPTYING MATERIALS HANDLING CONTAINERS
Filed Nov. 4, 1955 2 Sheets-Sheet 2
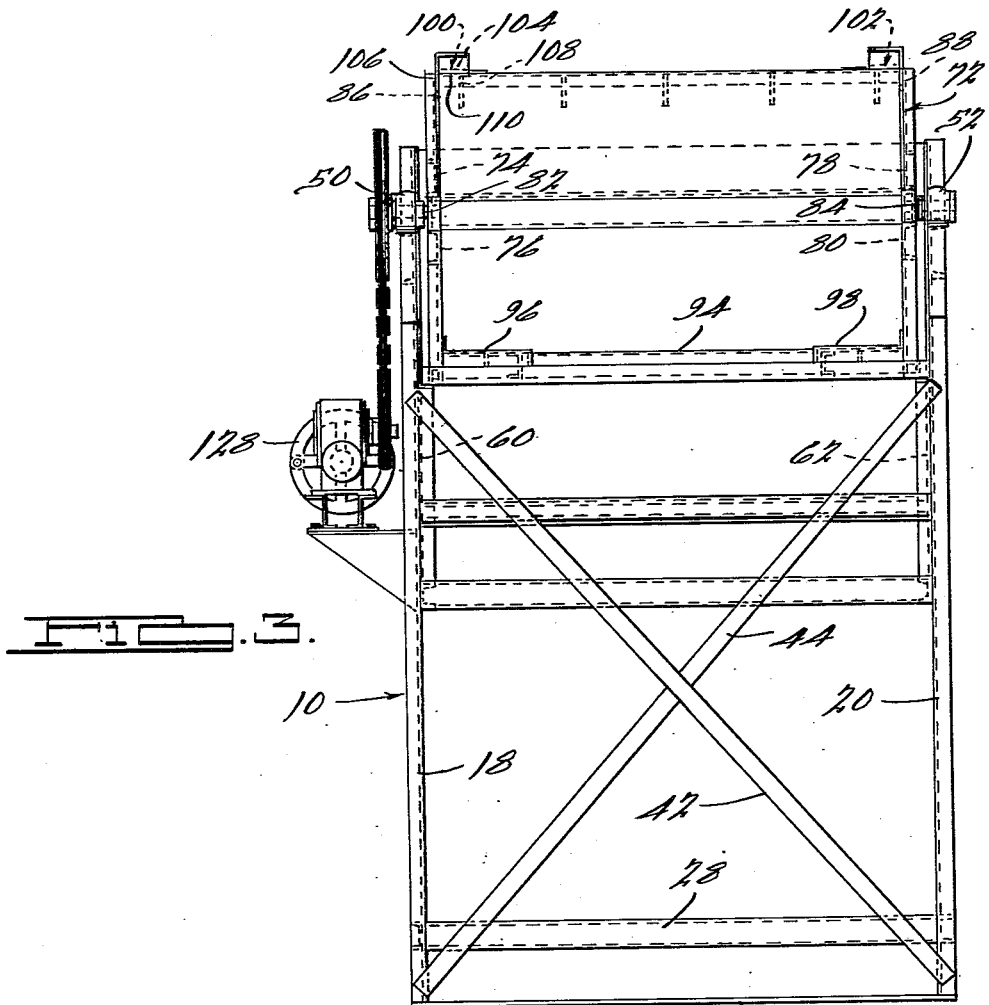
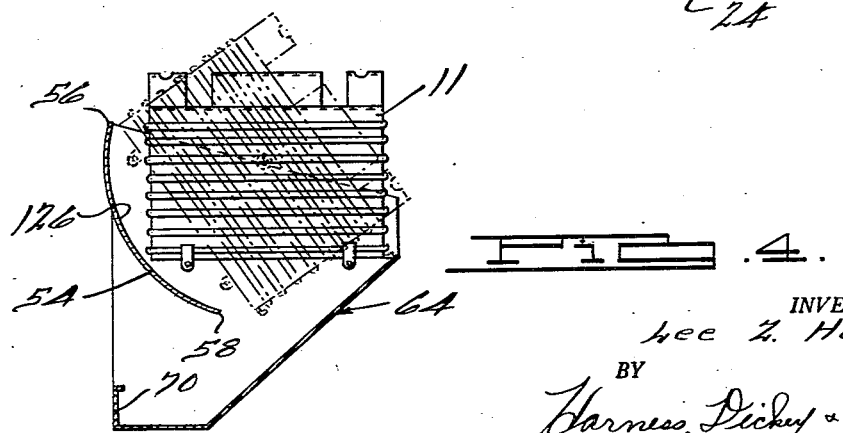
INVENTOR.
Lee Z. Hall
BY
Harness, Dickey & Pierce.
ATTORNEYS.

United States Patent Office 2,794,575
Patented June 4, 1957

2,794,575
APPARATUS FOR EMPTYING MATERIALS HANDLING CONTAINERS

Lee Z. Hall, Huntington Woods, Mich., assignor to Palmer-Shile Company, Detroit, Mich., a corporation of Michigan Application November 4, 1955, Serial No. 544,932

3 Claims. (Cl. 222—165)

This invention relates to materials handling equipment and, more particularly, to improved apparatus for emptying materials handling containers, such as skid boxes, stacking boxes, corrugated steel boxes, portable storage bins, ventilated boxes, ringed pallets, tote boxes and the like.

An object of the invention is to overcome disadvantages in prior apparatus of the indicated character and to provide improved apparatus for emptying materials handling containers incorporating means for controlling the rate at which the contents of the containers are emptied therefrom.

Another object of the invention is to provide improved apparatus for dumping materials handling containers that is economical to manufacture and assemble, durable, efficient and reliable in operation.

Another object of the invention is to provide improved apparatus for emptying materials handling containers which facilitates the continuous flow of materials to a work station.

Another object of the invention is to provide improved apparatus for emptying materials handling containers incorporating improved means for dumping material contained in such containers from the containers without damage to the material.

Another object of the invention is to provide improved apparatus for emptying materials handling containers which reduces the time, labor and expense of emptying such containers and moving the contents thereof to a work station.

Another object of the invention is to provide improved apparatus for emptying materials handling containers which is adapted to empty a wide variety of materials handling containers of various sizes and types and which eliminates the necessity of handling special size and box types.

Another object of the invention is to provide improved apparatus for emptying materials handling containers which may be readily transported from one plant location to another desired location.

The above as well as other objects and advantages of the present invention will become apparent from the following description, the appended claims and the accompanying drawings wherein:

Figure 1 is a perspective view of apparatus embodying the present invention, and showing a materials handling container positioned therein;

Fig. 2 is a side elevational view of the apparatus illustrated in Fig. 1 with the materials handling container removed therefrom;

Fig. 3 is an end elevational view of the structure illustrated in Fig. 2; and

Fig. 4 is a fragmentary side elevational view, with portions in section, of the apparatus illustrated in Fig. 1, and showing the same in the dumping position.

Referring to the drawings, the present invention is shown incorporated in materials handling apparatus, generally designated 10, which is particularly adapted to empty materials handling containers such as skid boxes, stacking boxes, corrugated steel boxes, portable storage bins, ventilated boxes, ringed pallets, tote boxes and the like, although it will be understood that the present invention is applicable to other uses. By way of illustration, in Figs. 1 and 4, a corrugated steel box 11 is shown positioned in the apparatus 10.

The apparatus 10 is comprised of a base 12 which includes spaced vertically extending front legs 14 and 16 and spaced vertically extending rear legs 18 and 20, the front legs 14 and 16 terminating in upwardly spaced relationship with respect to the upper ends of the rear legs 18 and 20. The lower ends of the front legs 14 and 16 and the lower ends of the rear legs 18 and 20 are joined by horizontally extending base plates 22 and 24, respectively, which rest on the floor or other supporting surface. At a position near, but spaced from, the base plates 22 and 24, the legs 14 and 18, the legs 18 and 20, and the legs 16 and 20 are joined by horizontally extending tie members 26, 28, and 30. Horizontally extending tie members 32, 34, 36, 38 and 40 are provided in upwardly spaced relationship with respect to the tie members 26, 28 and 30, and cross braces 42 and 44 are also provided, the opposite end portions of which are fixed to the legs 18 and 20 to further strengthen the apparatus.

A pair of generally channel-sectioned, horizontally extending support members 46 and 48 are provided on opposite sides of the base 12, the support members 46 and 48 carrying aligned bearing members 50 and 52. One end of the support member 46 is fixed to the upper end of the rear leg 18 while the opposite end of the support member 46 is fixed to the front leg 14 at a position spaced from the upper end thereof. One end of the support member 48 is fixed to the upper end of the rear leg 20 while the opposite end of the support member 48 is fixed to the front leg 16 at a position spaced from the upper end thereof.

An arcuate guide member 54 is provided which extends from side to side of the base 12 at a position near the front portion thereof. The center of curvature of the guide member 54 coincides with the aligned longitudinal axes of the bearings 50 and 52, and in the embodiment of the invention illustrated, the guide member 54, in cross section, subtends an arc of approximately 90 degrees. The upper edge 56 of the guide member 54 terminates in upwardly spaced relationship with respect to the aligned axes of the bearings 50 and 52 while the lower edge 58 of the guide member is substantially downwardly spaced from the aligned axes of the bearings 50 and 52, the side edges of the guide member 54 being fixed to closure plates 60 and 62 provided on opposite sides of the base 12. As will be described hereinafter in greater detail, the guide member 54 controls the rate at which the material initially disposed in the container 11 is emptied therefrom and, at the same time, prevents such material from dropping a relatively long distance as the material is emptied from the container.

An angularly disposed chute 64 is provided which extends from side-to-side of the base 12, the side portions of the chute being fixed to the closure plates 60 and 62. The chute 64 includes an inclined section 66 which is disposed in spaced relationship with respect to the lower edge 58 of the guide member 54, the upper end portion of the inclined section of the chute being fixed to the rear legs 18 and 20 at a position adjacent the upper end of the cross braces 42 and 44. The lower end of the inclined section of the chute merges with a substantially flat section 68 which serves as a tray, a vertically extending wall 70 being provided at the outer end of the flat section 66 to prevent the material from spilling therefrom. It will be understood that the chute 64 may extend in any desired direction or may, for example, be replaced by a traveling conveyor or other suitable means for guiding the material emptied from the container 11 to a desired location.

The apparatus 10 also includes a carriage 72 which is adapted to receive the materials handling containers and which is adapted to invert the containers so as to empty the contents therefrom. The carriage 72 includes a pair of spaced support pieces 74 and 76 on one side thereof and a pair of spaced support pieces 78 and 80 on the opposite side thereof. The support pieces 74 and 76 carry a shaft 82 which projects outwardly therefrom while the support pieces 78 and 80 carry a shaft 84 which projects outwardly therefrom. The shaft 82 is journaled for rotation in the bearing 50 while the shaft 84 is journaled for rotation in the bearing 52, the longitudinal axes of the shafts 82 and 84 being substantially coaxially aligned and coinciding with the longitudinal axes of the bearings 50 and 52. The carriage also includes a pair of angle-sectioned front corner members 86 and 88 and a pair of channel-sectioned rear corner members 90 and 92. The lower end portions of the corner members of the carriage are joined by a frame 94, and reinforced platforms 96 and 98 are fixed to the frame 94 and the corner members on opposite sides of the carriage, the platforms 96 and 98 being adapted to support the legs or base of the materials handling containers when the containers are positioned in the carriage.

In order to retain the materials handling containers in the carriage 72 when the carriage is in the inverted position, a pair of retaining members 100 and 102 are provided, the retaining member 100 extending between the upper end portions of the corner members 86 and 90 while the retaining member 102 extends between the upper ends of the corner members 88 and 92. The retaining members 100 and 102 each include an inwardly extending web portion 104 which is disposed in substantially parallel relationship with respect to the plane of the platforms 96 and 98, and a pair of spaced flange portions 106 and 108 which define a channel 110 adapted to receive and retain the upper edges of the side walls of the materials handling container 11 or to engage the crane lugs 111 on the containers, as the case may be. The front of the container 11 engages the front corner members 86 and 88 of the carriage when the container 11 is positioned therein. With the above-described construction, when the materials handling container 11 is positioned in the carriage 72, the container is retained in the carriage when the carriage is rotated in a counterclockwise direction, as viewed in Fig. 2, to an inverted position.

In order to facilitate guiding the container into the carriage 72, a pair of angularly extending guide elements 112 and 114 are provided, the guide elements 112 and 114 engaging the leading upper edges of the container and guiding the side walls thereof or the crane lugs, as the case may be, into the channels 110 defined by the retaining elements 100 and 102.

As shown in Fig. 1, the rear end of the carriage 72 is open to facilitate the entry of the materials handling containers into the carriage 72. The front end of the carriage is closed, in the embodiment of the invention illustrated, by a front wall 116 which extends between the corner members 86 and 88. A generally angle-sectioned baffle member 118 is provided having a horizontally extending flange portion 120 fixed to the corner members 86 and 88 at the upper ends thereof. The baffle member 118 also includes a flange 122 which is disposed in outwardly spaced relationship with respect to the corner members 86 and 88. The perpendicular distance between the radially outermost corner 124 of the baffle member 118 and the axis of rotation of the carriage 72 is slightly less than the radius of curvature of the guide member 54. For example, the perpendicular distance from the axis of rotation of the carriage 72 to the radially outermost edge 124 of the baffle member 118 may be approximately one-fourth of an inch less than the radius of curvature of the inner surface 126 of the guide member 54 if relatively large parts are being emptied from the container 11. However, if desired, the perpendicular distance between the radially outermost edge 124 of the baffle member 118 and the axis of rotation of the carriage 72 may be substantially the same as the radius of curvature of the inner surface 126 of the guide member 54 if relatively minute material is emptied from the container 72, sufficient clearance being provided between the baffle member 118 and the guide member 54 to permit the baffle member to move angularly past the guide member 54 as the carriage 72 is inverted. With such a construction, the material in the container is retained by the baffle member 118 and the guide member 54 while the carriage 72 and the container are being inverted until the baffle member 118 has moved through an angular increment greater than the angle subtended by the guide member 54. When the baffle member 118 clears the lower edge of the guide member 54, the material is then permitted to drop onto the chute 64.

In order to facilitate inverting the carriage 72, a conventional gear reduction unit 128 is provided which is carried by the base 12. In the embodiment of the invention illustrated, the gear reduction unit 128 is shown as being manually powered by a wheel 130. It will be understood, however, that any desired or conventional means may be employed for actuating the carriage 72. For example, conventional electric motors, fluid actuated motors, or other suitable means may be utilized to invert the carriage 72. In the embodiment of the invention illustrated, the gear reduction unit is shown as being provided with a driving sprocket 132, which is drivably connected by a chain 134 to a driven sprocket 136, the hub portion of which is fixed to the shaft 82.

In the operation of the apparatus, a materials handling container, such as the corrugated steel box 11, is inserted between the rear corner members 90 and 92 into the carriage 72, as by a fork lift truck, the guide elements 112 and 114 engaging the upper edges of the box or the crane lugs thereon, as the case may be, and guiding the box into the carriage so that the box rests on the platforms 96 and 98 while the retaining elements 100 and 102 engage the upper portion of the box and retain the box in the carriage when the carriage is inverted. The carriage 72 and the box 11 are then inverted angularly in a counterclockwise direction, as viewed in Figs. 2 and 4, about the longitudinal axes of the shafts 82 and 84, through the agency of the gear reduction unit 128, as described hereinabove.

As the carriage and the box are rotated, the baffle member 118 moves past the arcuate guide member 54 in close proximity thereto, thereby preventing the material contained in the box from dropping past the baffle member 118. When the carriage and the box 11 have rotated through an angular increment such that the baffle member 118 clears the lower edge 58 of the guide member 54, the material is permitted to fall the relatively short distance onto the chute 64. The rate at which the material is emptied from the container may be readily controlled by varying the rate of angular movement of the baffle member 118 past the lower edge 58 of the guide member 54. The material then moves down the chute 64 to the tray portion 68 thereof, the plate 70 preventing the material from spilling from the tray.

While a preferred embodiment of the invention has been shown and described, it will be understood that various changes and modifications may be made without departing from the spirit of the invention.

What is claimed is:

1. Apparatus for dumping open top materials handling containers including, in combination, a base, a carriage adapted to receive a container, means connecting the opposite sides of said carriage to said base for pivotal movement about a substantially horizontal axis extending transversely of said carriage intermediate the ends thereof, an arcuate guide member fixed to said base, the center of curvature of said guide member coinciding with said axis, the perpendicular distance from said axis to the upper edge of said carriage near said guide member being slightly less than the radius of curvature of said guide member, a baffle member fixed to said carriage adjacent said edge and cooperating with said guide member to retain the material initially disposed in said container during a predetermined increment of angular movement of said carriage about said axis, and means for rotating said carriage.

2. Apparatus for dumping materials handling containers comprising, in combination, a base, a carriage adapted to receive a container, retaining means on said carriage adapted to engage a container and hold the container in said carriage when said carriage is in an inverted position, means pivotally connecting said carriage to said base whereby said carriage may be moved angularly to an inverted position, chute means fixed to said base below said carriage, means including an arcuate guide member fixed to said base for controlling the rate at which material is emptied from said container into said chute, the center of curvature of said guide member coinciding with the pivotal axis of said carriage, the swinging radius of said carriage being slightly less than the radius of curvature of said guide member, and guide elements on one end of said carriage aligned with said retaining means for engaging and guiding a container into said carriage and into engagement with said retaining means.

3. Apparatus for dumping materials handling containers comprising, in combination, a base, a carriage pivotally connected to opposite sides of said base and adapted to receive a container, means on said carriage for retaining a container in said carriage when said carriage is in an inverted position, chute means fixed to said base below said carriage, means including an arcuate guide member fixed to said base for controlling the rate at which material is emptied from said container into said chute, the center of curvature of said guide member coinciding with the pivotal axis of said carriage, the upper edge of said guide member being disposed above said axis and the lower edge of said guide member being disposed substantially below said axis, the swinging radius of said carriage being slightly less than the radius of curvature of said guide member, guide means on one end of said carriage aligned with said retaining means for engaging and guiding a container into said carriage and into engagement with said retaining means, and means for pivoting said carriage about said axis.

References Cited in the file of this patent
UNITED STATES PATENTS

| | | |
|---|---|---|
| 1,021,649 | Wodarra | Mar. 26, 1912 |
| 1,277,836 | Bierer et al. | Sept. 3, 1918 |
| 1,305,087 | Galloway | May 27, 1919 |
| 1,488,465 | Barkley | Apr. 1, 1924 |
| 2,215,735 | Jones | Sept. 24, 1940 |